(12) United States Patent
Ohira et al.

(10) Patent No.: US 9,112,229 B2
(45) Date of Patent: Aug. 18, 2015

(54) CATHODE ACTIVE MATERIAL, CATHODE ELECTRODE, AND NON-AQUEOUS SECONDARY BATTERY

(75) Inventors: Koji Ohira, Osaka (JP); Motoaki Nishijima, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 518 days.

(21) Appl. No.: 13/463,102

(22) Filed: May 3, 2012

(65) Prior Publication Data

US 2012/0288763 A1    Nov. 15, 2012

(30) Foreign Application Priority Data

May 9, 2011 (JP) ................................ 2011-104573

(51) Int. Cl.
| H01M 4/58 | (2010.01) |
| H01M 4/131 | (2010.01) |
| H01M 4/505 | (2010.01) |
| H01M 4/525 | (2010.01) |
| H01M 10/052 | (2010.01) |
| C01B 25/45 | (2006.01) |
| H01M 4/62 | (2006.01) |
| H01M 4/02 | (2006.01) |

(52) U.S. Cl.
CPC ............ H01M 4/5825 (2013.01); C01B 25/45 (2013.01); H01M 4/131 (2013.01); H01M 4/505 (2013.01); H01M 4/525 (2013.01); H01M 10/052 (2013.01); *H01M 4/621* (2013.01); *H01M 4/624* (2013.01); *H01M 2004/028* (2013.01); *Y02E 60/122* (2013.01); *Y02T 10/7011* (2013.01)

(58) Field of Classification Search
CPC ... H01M 4/5825; H01M 4/136; H01M 4/621; H01M 4/624; H01M 4/505; H01M 10/052; H01M 2004/028; Y02E 60/122
See application file for complete search history.

(56) References Cited

U.S. PATENT DOCUMENTS

| 6,136,472 A | 10/2000 | Barker et al. | |
| 2003/0054253 A1* | 3/2003 | Morishima et al. | ...... 429/231.95 |
| 2012/0244443 A1 | 9/2012 | Ohira et al. | |

FOREIGN PATENT DOCUMENTS

| CN | 101364643 A | 2/2009 |
| JP | 2002-198050 | 7/2002 |
| JP | 2002-519836 | 7/2002 |
| JP | 2002-358965 | 12/2002 |
| JP | 2005-519451 | 6/2005 |
| JP | 2005-522009 | 7/2005 |
| JP | 2008-506243 | 2/2008 |
| JP | 2009-104794 | 5/2009 |
| WO | WO 2008/039170 | 4/2008 |
| WO | WO 2010/134579 | 11/2010 |

* cited by examiner

*Primary Examiner* — Laura Weiner
(74) *Attorney, Agent, or Firm* — Nixon & Vanderhye P.C.

(57) ABSTRACT

A cathode active material comprising a composition represented by the following general formula (1):

$$Li_a M1_x M2_y M3_z P_m Si_n O_4 \qquad (1)$$

wherein M1 is at least one kind of element selected from the group of Mn, Fe, Co and Ni; M2 is any one kind of element selected from the group of Ti, V and Nb; M3 is at least one kind of element selected from the group of Zr, Sn, Y and Al; "a" satisfies $0 < a \le 1$; "x" satisfies $0 < x \le 2$; "y" satisfies $0 < y < 1$; "z" satisfies $0 \le z < 1$; "m" satisfies $0 \le m < 1$; and "n" satisfies $0 < n \le 1$.

10 Claims, 1 Drawing Sheet

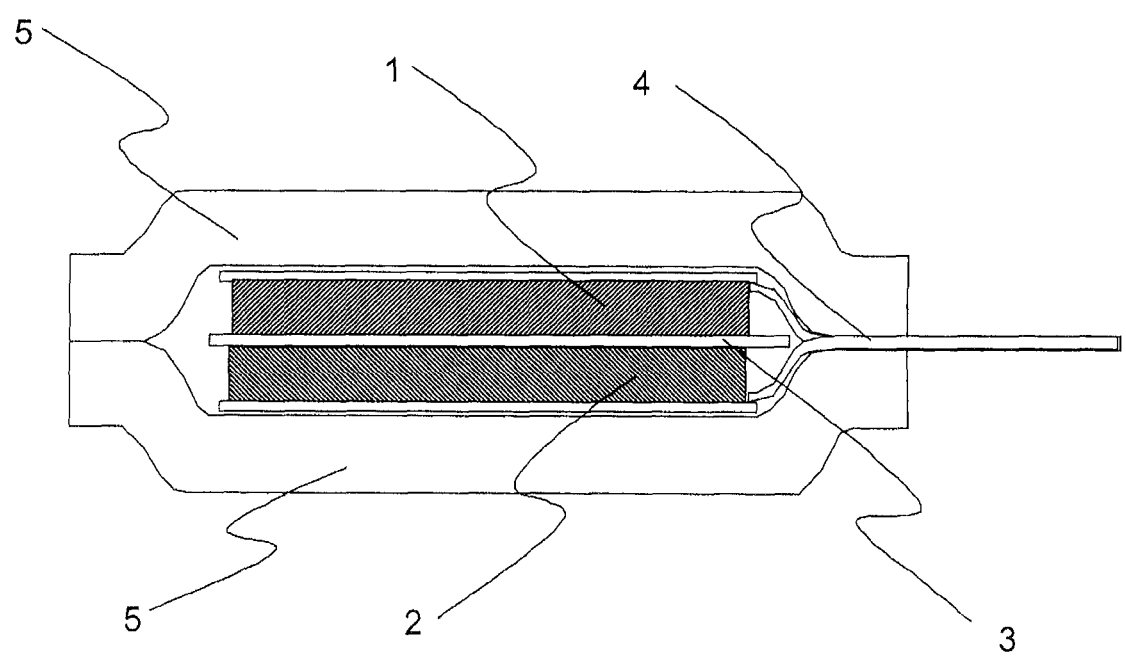

CATHODE ACTIVE MATERIAL, CATHODE ELECTRODE, AND NON-AQUEOUS SECONDARY BATTERY

CROSS-REFERENCE TO RELATED APPLICATION

This application is related to Japanese application No. 2011-104573 filed on May 9, 2011, whose priority is claimed under 35 USC §119, the disclosure of which is incorporated by reference in its entirety.

BACKGROUND OF THE INVENTION

1. Field of the Invention

The present invention relates to a cathode active material, a cathode electrode and a non-aqueous secondary battery. More particularly, the present invention relates to a cathode active material and a cathode electrode that give a non-aqueous secondary battery excellent in cycle characteristics and charge/discharge characteristics as well as to a non-aqueous secondary battery excellent in cycle characteristics and charge/discharge characteristics.

2. Description of the Related Art

As a secondary battery for a portable electronic apparatus, a non-aqueous secondary battery such as a lithium secondary battery is put into practical use and is widely prevalent. Further, in recent years, a lithium secondary battery is attracting people's attention not only as a small one for a portable electronic apparatus but also as a large-capacity device for being mounted on a vehicle or for electric power storage. For this reason, there is an increasing demand for safety, cost performance, lifetime and the like.

A lithium secondary battery has a cathode electrode, an anode electrode, an electrolyte and a separator as principal constituent elements thereof. Also, the cathode electrode is constituted of a cathode active material, an electroconductive material and a binder (binding agent).

Generally, a layered transition metal oxide represented by $LiCoO_2$ is used as the cathode active material. However, the layered transition metal oxide is liable to provoke oxygen elimination in a fully charged state at a comparatively low temperature around 150° C., and this oxygen elimination can provoke thermal bursting reaction of the battery. Therefore, when a battery having such a cathode active material is used in the portable electronic apparatus, there is a fear that an accident such as heat generation or fire catching of the battery may occur.

For this reason, in view of safety, lithium manganate ($LiMn_2O_4$) having a spinel structure, lithium iron phosphate ($LiFePO_4$) having an olivine structure and the like that are stable in structure and do not release oxygen at an abnormal time are expected.

Also, in view of cost performance, cobalt (Co) has a problem of having a low degree of presence in the earth crust and being expensive. For this reason, lithium nickelate ($LiNiO_2$) or a solid solution thereof.

($Li(Co_{1-x}Ni_x)O_2$), lithium manganate ($LiMn_2O_4$), lithium iron phosphate ($LiFePO_4$) and the like that do not contain cobalt or have a small content of cobalt are expected.

Also, in view of lifetime, layered transition metal oxides have a problem of causing destruction of the structure of the cathode active material by intercalation and deintercalation of Li to and from the cathode active material accompanying charging/discharging. For this reason, because of being stable in structure, lithium manganate ($LiMn_2O_4$) having a spinel structure, lithium iron phosphate ($LiFePO_4$) having an olivine structure and the like are expected rather than the layered transition metal oxide.

Therefore, as a cathode active material of a battery considering safety, cost performance, lifetime and the like, the above-described lithium iron phosphate having an olivine structure, for example, is attracting people's attention. However, when lithium iron phosphate having an olivine structure is used as a cathode active material in a battery, there will be a problem of lowering of the charge/discharge characteristics such as insufficient electron conductivity and low average electric potential.

For this reason, for the purpose of improving the charge/discharge characteristics, a cathode active material represented by the general formula $A_aM_b(XY_4)_cZ_d$ (wherein A is an alkali metal; M is a transition metal; $XY_4$ is $PO_4$ or the like; and Z is OH or the like) is proposed (for example, see Japanese Unexamined Patent Publication No. 2005-522009: Patent Document 1).

Also, a cathode active material represented by the general formula $LiMP_{1-x}A_xO_4$ (wherein M is a transition metal; A is an element having an oxidation number ≤+4 ("≤" means "<" and "="); and 0<x<1) in which a P-site is substituted with the element A is proposed (for example, see Japanese Unexamined Patent Publication No. 2008-506243: Patent Document 2).

Also, as a cathode active material excellent in charge/discharge characteristics at a large electric current, a material represented by the general formula $Li_{1-x}A_xFe_{1-y-z}M_yMe_zP_{1-m}X_mO_{4-n}Z_n$ (wherein A is Na or K; M is a metal element other than Fe, Li and Al; X is Si, N or As; Z is F, Cl, Br, I, S or N) (for example, see Japanese Unexamined Patent Publication No. 2002-198050: Patent Document 3) and, as an electrode active material being economical at the time of production and having a good charging capacity and good rechargeability over multiple cycles, a material represented by $A_{a+x}M_bP_{1-x}Si_xO_4$ (wherein A is Li, Na or K and M is a metal) (for example, see Japanese Unexamined Patent Publication No. 2005-519451: Patent Document 4) are proposed.

Further, lithium transition metal phosphorus such as $LiFePO_4$ in which a difference in molar volume between at least two coexisting phases containing a lithium-rich transition metal phosphate phase and a lithium-poor transition metal phosphate phase is about 5.69 is proposed (for example, see Table 2 of International Publication No. 2008/039170: Patent Document 5).

Also, it is proposed to restrain the volume change ratio with a material represented by the general formula $LiFe_{1-x}M_xP_{1-y}X_yO_4$ (wherein M is Zr, Sn, Y or Al) (for example, see International Publication No. 2010/134579: Patent Document 6). In an example of Patent Document 6, a cathode active material in which M contains Zr is disclosed.

SUMMARY OF THE INVENTION

The inventors of the present invention have found out that a non-aqueous secondary battery having an extension of the lifetime and excellent charge/discharge characteristics can be realized by substituting an element in lithium iron phosphate as a basic structure to restrain the expansion/contraction, thereby completing the present invention.

Thus, according to the present invention, there is provided a cathode active material comprising a composition represented by the following general formula (1):

$$Li_aM1_xM2_yM3_zP_mSi_nO_4 \qquad (1)$$

wherein M1 is at least one kind of element selected from the group of Mn, Fe, Co and Ni; M2 is any one kind of element selected from the group of Ti, V and Nb; M3 is at least one kind of element selected from the group of Zr, Sn, Y and Al; "a" satisfies $0<a\leq1$; "x" satisfies $0<x\leq2$; "y" satisfies $0<y<1$; "z" satisfies $0\leq z<1$; "m" satisfies $0\leq m<1$; and "n" satisfies $0<n\leq1$.

Also, according to the present invention, there is provided a cathode electrode comprising the above-described cathode active material, an electroconductive material and a binder.

Further, according to the present invention, there is provided a non-aqueous secondary battery comprising the aforesaid cathode electrode, an anode electrode, an electrolyte and a separator.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1 is a schematic cross-sectional view of the non-aqueous secondary battery fabricated in Example of the present invention.

DETAILED DESCRIPTION OF THE PREFERRED EMBODIMENTS

The cathode active materials having the construction described in Patent Documents 1 to 5 do not solve the problem of short lifetime of the obtained non-aqueous secondary battery.

Specifically, with the construction of the cathode active materials described in Patent Documents 1 to 5, expansion or contraction caused by intercalation/deintercalation of Li by charging/discharging is large. For this reason, when the cycle number increases, there is a fear that the cathode active material may gradually drop off physically from a current collector or an electroconductive material, thereby destroying the structure of the cathode active material. This is because, with a material exhibiting large expansion or contraction due to charging/discharging, internal resistance of the battery increases due to destruction of secondary particles or destruction of an electroconductive path between the cathode active material and the electroconductive material. As a result thereof, a cathode active material that does not contribute to charging/discharging increases, thereby lowering the capacity and decreasing the lifetime of the battery.

Also, in Patent Document 6, the volume change ratio of the cathode active material can be restrained, so that decrease in the capacity due to repetition of charging/discharging can be restrained. However, there is room for improvement of discharging capacity.

As described above, a cathode active material excellent in all of safety, cost performance, lifetime and discharging capacity is demanded.

Hereafter, the present invention will be described in more detail. Here, in the present specification, "A to B" representing a range means being larger than or equal to A and smaller than or equal to B. Also, various physical properties mentioned in the present specification mean values measured by methods described in the examples mentioned later unless specifically stated otherwise.

(I) Cathode Active Material

The cathode active material of the present invention is represented by the following general formula (1):

$$Li_aM1_xM2_yM3_zP_mSi_nO_4 \qquad (1)$$

wherein M1 is at least one kind of element selected from the group of Mn, Fe, Co and Ni; M2 is any one kind of element selected from the group of Ti, V and Nb; M3 is at least one kind of element selected from the group of Zr, Sn, Y and Al; "a" satisfies $0<a\leq1$; "x" satisfies $0<x\leq2$; "y" satisfies $0<y<1$; "z" satisfies $0\leq z<1$; "m" satisfies $0\leq m<1$; and "n" satisfies $0<n\leq1$.

Here, almost all of materials having the composition of the general formula (1) have an olivine structure. However, the scope of the present invention is not limited to a construction having an olivine structure, so that a construction without having an olivine structure is also included within the scope of the present invention. Here, in the present invention, the olivine type structure means a structure represented by a crystal structure of olivine in which the oxygen atoms have an almost hexagonal closest packing structure and the other atoms enter the gaps of the hexagonal closest packing structure.

Generally, in a case of lithium iron phosphate of olivine type, it contracts in volume when Li is deintercalated from an initial structure by charging. In this structural change, an a-axis and a b-axis contract and a c-axis expands. For this reason, the inventors of the present invention have considered that the volume change can be restrained by decreasing the contraction ratio of the a-axis and the b-axis and increasing the expansion ratio of the c-axis by some kind of substitution of an element constituting lithium iron phosphate.

Further, the inventors have found out that, by substituting part of a P site with Si and substituting part of an M1 site with other elements, electric charge compensation within a crystal structure is carried out, and also the volume change occurring at the time of Li deintercalation is restrained and also the expansion/contraction due to charging/discharging is restrained. On the other hand, the inventors have found out that, by substituting the P site with Si, there are cases in which any of the elements of M1, M2 and M3 is present at a Li site.

In the cathode active material of the present invention, the P site is substituted with Si, and the valence numbers of P and Si are different, so that electric charge compensation within the crystal structure must be carried out. For this reason, the M1 site is substituted with M2 and M3.

Also, the total amount of the elements of M1, M2 and M3 that are present at the Li site is preferably 5 at. % or less. M1, M2 and M3 that are present at the Li site may cause inhibition of diffusion of Li in an olivine type structure having only a one-dimensional diffusion path. This inhibition may greatly decrease the charge/discharge characteristics, so that the amount of presence of the above-described elements is preferably as small as possible.

An average particle size of primary particles of the cathode active material is preferably small for shortening the diffusion path. Specifically, the average particle size is preferably at least 1 μm or less, more preferably 500 nm or less. A lower limit thereof is preferably 10 nm.

Also, the volume change ratio accompanying the intercalation and deintercalation of Li in the general formula (1) is preferably 6% or less. A reason therefor is as follows. That is, in the cathode active material of the present invention, the volume change ratio of a unit lattice (volume expansion/ contraction ratio by charging/discharging) can be reduced by about 10% from that of conventional $LiFePO_4$. By this reduction, a significant difference is generated with regard to a long-term lifetime of 1000 cycles or more. In other words, by reducing the volume change ratio by about 10%, a significant difference is generated in long-term reliability though it may appear that no difference is generated in short-term reliability. That is, expansion/contraction of the cathode electrode by charging/discharging is restrained, and bonding of the current collectors, electroconductive materials, and active materials with each other can be maintained, whereby a cathode active material capable of providing a battery having a longer lifetime can be provided.

Also, the cathode active material according to the present invention preferably has a relationship of (discharging capacity of 2 C [mAh/g])/(discharging capacity of 0.1 C [mAh/g])≥0.9. Further, as an initial discharging capacity, the capacity is preferably 100 mAh/g or more in the 0.1 C discharging. Here, "1 C" refers to an electric current value needed when all of a theoretical capacity of the cathode active material is charged and discharged in one hour. With this construction, a cathode active material capable of providing a battery having a longer lifetime can be provided.

(1) M1

M1 is selected from the group of Mn, Fe, Co and Ni which are 3d transition metal elements. In particular, Mn and Fe are preferable because it is known that Mn and Fe have an olivine structure whereby a cathode active material capable of intercalation/deintercalation of Li can be obtained. Fe and Mn can be used by being mixed. In particular, Mn is preferable because a high electric potential can be obtained.

(2) M2

M2 is preferably an element that generates a valence number change. Such an element produces an effect of improving electron conductivity. Also, since the substituted element generates a valence number change, chargeable/dischargeable Li amount can also be increased. In the present invention, any one of Ti, V and Nb is selected as such an element.

When M2 is Ti or V, there is a possibility that Ti or V may be contained in part of the P sites. Because of that, it can be considered that an activation energy of Li diffusion can be lowered, and the electron conductivity can be improved, whereby the charge/discharge characteristics can be improved.

The valence number of M2 is not particularly limited. Also, M2 does not have to have a constant valence number in an identical element. Ti can be from +2 valent to +4 valent; V can be from +2 valent to +5 valent; and Nb can be from +3 valent to +5 valent. Since M2 may assume a plurality of valence numbers in this manner, the electron conductivity is improved. As a result of this, the effect of restraining the volume change ratio can be increased, so that expansion/contraction of the cathode electrode due to charging/discharging can be restrained to a larger extent, whereby a cathode active material capable of providing a battery having a longer lifetime can be provided. In particular, Nb having a large effect of restraining the volume change ratio with a small amount of substitution is preferable.

(3) M3

M3 is preferably at least one kind of element selected from the group of Zr, Sn, Y and Al. M3 does not have to be contained. However, by substitution with an element other than M2, strain in the structure is alleviated, and the charge/discharge characteristics can be improved, so that it is also preferable that M3 is contained. In particular, when Ti having a large effect of improving the electron conductivity is contained as M2, it is preferable that Zr having a large effect of restraining the volume change is added as M3. Here, the valence number of M3 is not particularly limited.

(4) Ranges of "a", "x", "y", "z", "m" and "n" in the General Formula (1)

The ranges of "a", "x", "y", "z", "m" and "n" are not particularly limited as long as the compound of the general formula (1) functions as a cathode active material. For example, "a" can be within a range of 0<a≤1; "x" can be within a range of 0<x≤2; "y" can be within a range of 0<y<1; "z" can be within a range of 0≤z<1; "m" can be within a range of 0≤m<1; and "n" can be within a range of 0<n≤1. Within these ranges, a cathode active material capable of providing a battery more excellent in view of safety, cost performance, long lifetime and charge/discharge characteristics can be provided.

The Li sites are occupied by Li and optionally any elements of M1, M2 and M3. For this reason, Li assumes a range of 0<a≤1. For example, "a" may assume a value of 0.1, 0.2, 0.3, 0.4, 0.5, 0.6, 0.7, 0.8, 0.9 or 1. When a<1, loss of the Li sites or occupation of the Li sites by any elements of M1, M2 and M3 is occurring. Assuming that the content of M1, M2 and M3 occupying the Li sites is "b", a relationship of 0<a+b≤1 holds. For example, a+b may assume a value of 0.1, 0.2, 0.3, 0.4, 0.5, 0.6, 0.7, 0.8, 0.9 or 1.

Also, "a" approaches 0 by release of Li at the time of discharging and approaches 1 by return of Li at the time of charging. Therefore, the content "b" of M1, M2 and M3 occupying the Li site can be defined by examining the composition of the cathode active material immediately after production or at the time of charging.

The content "x" of M1 satisfies a relationship of 0<x≤2 in view of obtaining a cathode active material capable of providing a battery more excellent in view of safety, cost performance, long lifetime and charge/discharge characteristics. For example, "x" may assume a value of 0.2, 0.4, 0.6, 0.8, 1, 1.2, 1.4, 1.6, 1.8 or 2. When the content of M1 decreases, the capacity of charging/discharging may decrease, so that "x" preferably satisfies a relationship of 0.5≤x≤2. Also, since the olivine structure is obtained when the ratio between Li sites, Fe sites and P sites is 1:1:1, "x" preferably satisfies a relationship of 0.5≤x≤1 which is a range expected to give the olivine structure.

The content "y" of M2 satisfies 0<y<1. By substituting M1 with these elements within this range, the volume change can be restrained. For example, "y" may assume a value of 0.1, 0.2, 0.3, 0.4, 0.5, 0.6, 0.7, 0.8 or 0.9. Also, since these elements tend to lower an average electric potential of discharging as compared with Fe, "y" is preferably within a range of 0<y≤0.125.

The content "z" of M3 satisfies 0≤z<1. Substitution of M1 with M3 within this range enables restraining of the volume change. For example, "z" may assume a value of 0, 0.1, 0.2, 0.3, 0.4, 0.5, 0.6, 0.7, 0.8 or 0.9. Also, "z" is preferably within a range of 0≤z≤0.125.

Further, when x+y+x≥1, a cathode active material capable of providing a battery more excellent in view of safety, cost performance, long lifetime and charge/discharge characteristics can be provided.

Also, it is preferable that M1 and M2 are contained, and M3 may or may not be contained. Also, it is preferable that the content of M1 is the largest and, more specifically, x is preferably at least within a range of x≥y+z. Also, in order to make the structure of the general formula (1) be an olivine structure, x+y+z is preferably within a range of 0.9≤x+y+z≤1.1. For example, x+y+z may assume a value of 0.9, 0.93, 0.95, 0.98, 1, 1.05, 1.08 or 1.1.

When the cathode active material contains Ti, V or Nb, the content of these is represented by y+z. Specifically, the Ti content y+z is preferably within a range of $0.01 \leq y+z \leq 0.125$. When the content is larger than 0.125, the average electric potential of discharging may decrease due to an influence of Ti. When the content is smaller than 0.01, the effect of restraining the volume change by addition may not be obtained. For example, y+z may assume a value of 0.01, 0.03, 0.05, 0.07, 0.09, 0.11 or 0.125.

Also, the V content y+z is preferably within a range of $0.01 \leq y+z \leq 0.125$. When the content is larger than 0.125, the average electric potential of discharging may decrease due to an influence of V. On the other hand, when the content is smaller than 0.01, the effect of restraining the volume change by addition may not be obtained. For example, y+z may assume a value of 0.01, 0.03, 0.05, 0.07, 0.09, 0.11 or 0.125.

Further, the Nb content y+z is preferably within a range of $0.01 \leq y+z \leq 0.1$. When the content is larger than 0.1, an impurity may be produced, making it difficult to synthesize a single phase. On the other hand, when the content is smaller than 0.01, the effect of restraining the volume change by addition may not be obtained. For example, y+z may assume a value of 0.01, 0.03, 0.05, 0.07, 0.09 or 0.1. y+z is more preferably within a range of $0.01 \leq y+z \leq 0.05$.

By setting Ti, V or Nb to be within the above-described range, not only excellent charge/discharge characteristics can be obtained while restraining the volume change but also formation of an impurity phase is restrained, whereby the single phase can be stably obtained. As a result, the volume change occurring at the time of intercalation and deintercalation of Li can be restrained, and also the diffusibility of Li ions can be improved. For this reason, when a battery is fabricated using the cathode active material, the expansion and contraction of the cathode electrode caused by charging/discharging can be restrained, and also excellent charge/discharge characteristics can be obtained. Therefore, a cathode active material capable of providing a battery excellent not only in safety and cost performance but also in long lifetime and charge/discharge characteristics can be provided.

Also, the P site contains P and Si. Therefore, the sum of the values of m and n is preferably within a range of $0 < m+n \leq 1.5$. In this case, a cathode active material capable of providing a battery more excellent in view of safety, cost performance, long lifetime and charge/discharge characteristics can be provided. For example, m+n may assume a value of 0.1, 0.3, 0.5, 0.7, 0.9, 1.1, 1.3 or 1.5.

Further, the P site may contain any element of M3. Assuming that the content of M3 contained in the P site is "1", it is preferable that a relationship of $0 < m+n+1 < 1.5$ holds. For example, m+n+1 may assume a value of 0.1, 0.3, 0.5, 0.7, 0.9, 1.1 or 1.3. More preferably, m+n+1 is within a range of $0.9 \leq m+n+1 \leq 1.1$. Among M3, the element contained in the P site is preferably any element of Al, Ti, V and Nb.

Next, when a+x+y+z+m+n=3 holds, the structure of the general formula (1) has an olivine structure similar to that of $LiFePO_4$. For this reason, a cathode active material capable of providing a battery more excellent in view of safety, cost performance, long lifetime and charge/discharge characteristics can be provided. In this case, at least part of the P site may be substituted with Si, and also part of the M1 site may be substituted with an element capable of performing electric charge compensation within a crystal structure, whereby the volume change occurring at the time of intercalation/deintercalation of Li can be restrained. At this time, there is a possibility that part of the Li site and the P site may be substituted with any element of M1, M2 and M3. In particular, by substitution of the P site with Si, M1 is more likely to be present in the Li site. When any element of M1, M2 and M3 is present at the Li site, the content is preferably 5% or less, more preferably 3% or less. By the presence of any element of M1, M2 and M3 at the Li site, the volume change occurring at the time of intercalation/deintercalation of Li can be advantageously restrained. Also, a possibility may be considered that an M3 element may enter the P site. When Si or Al as M3 is present at the P site, the diffusibility of Li is advantageously improved. When Ti or V as M3 is present at the P site, the electron conductivity is advantageously improved.

(5) Specific Examples of Cathode Active Material

Specific examples of cathode active materials will be described below.

(i) M1=Fe, M2=Ti
$Li_aFe_xTi_yP_mSi_nO_4$ (no M3)
$Li_aFe_xTi_yZr_zP_mSi_nO_4$ (M3=Zr)
(ii) M1=Fe, M2=Nb
$Li_aFe_xNb_yP_mSi_nO_4$ (no M3)
$Li_aFe_xNb_yAl_zP_mSi_nO_4$ (M3=Al)
(iii) M1=Mn, M2=Ti
$Li_aMn_xTi_yP_mSi_nO_4$ (no M3)
$Li_aMn_xTi_yZr_zP_mSi_nO_4$ (M3=Zr)
(iv) M1=Fe, M2=Nb
$Li_aMn_xNb_yP_mSi_nO_4$ (no M3)
$Li_aMn_xNb_yAl_zP_mSi_nO_4$ (M3=Al)
(v) M1=Mn and Fe, M2=Ti
$Li_a(Mn_\alpha Fe_{1-\alpha})_xTi_yP_mSi_nO_4$ (no M3)
$Li_a(Mn_\alpha Fe_{1-\alpha})_xTi_yZr_zP_mSi_nO_4$ (M3=Zr)
wherein α satisfies $0 < \alpha < 1$
(vi) M1=Mn and Fe, M2=Nb
$Li_a(Mn_\alpha Fe_{1-\alpha})_xNb_yP_mSi_nO_4$ (no M3)
$Li_a(Mn_\alpha Fe_{1-\alpha})_xNb_yAl_zP_mSi_nO_4$ (M3=Al)
wherein α satisfies $0 < \alpha < 1$ (6) Method of Producing Cathode Active Material The cathode active material of the present invention can be produced by using an arbitrary combination of carbonates, hydroxides, chlorides, sulfates, acetates, oxides, oxalates, nitrates and the like of each element as a source material. As a production method, a method such as the solid phase method, the sol-gel method, the melting-quenching method, the mechanochemical method, the cosedimentation method, the hydrothermal method or the spray pyrolysis method can be used. Also, electric conductivity may be improved by attaching a carbon coating film to the cathode active material, which is generally carried out in lithium iron phosphate of olivine type.

Here, it is convenient that each source material of Li, M1, M2, M3, P and Si is weighed and quantitated so that "x", "y", "z", "m" and "n" will be within the above-described range when the molar ratio of Li in the Li source material is assumed to be 1.

(II) Cathode Electrode

The above-described cathode electrode is made of the above-described cathode active material, an electroconductive material and a binder, and can be fabricated, for example, by a known method such as applying a slurry obtained by mixing the active material, the electroconductive material and the binder with an organic solvent or water onto a current collector.

As the binder (binding agent), polytetrafluoroethylene, polyvinylidene fluoride, polyvinyl chloride, ethylene propylene diene polymer, styrene-butadiene rubber, acrylonitrile-butadiene rubber, fluorine-containing rubber, polyvinyl acetate, polymethyl methacrylate, polyethylene, nitrocellulose and the like can be used.

As the electroconductive material, acetylene black, carbon, graphite, natural graphite, artificial graphite, needle coke and the like can be used.

As the current collector, a foamed (porous) metal having continuous pores, metal formed into a honeycomb shape, a sintered metal, an expanded metal, a non-woven cloth, a plate, a foil, a perforated plate, a perforated foil and the like can be used.

As the organic solvent, N-methylpyrrolidone, toluene, cyclohexane, dimethylformamide, dimethylacetamide, methyl ethyl ketone, methyl acetate, methyl acrylate, diethyltriamine, N,N-dimethylaminopropylamine, ethylene oxide, tetrahydrofuran and the like can be used.

In the cathode electrode, the cathode active material is preferably contained at a ratio of 50 to 99 wt %. Also, the electroconductive material is preferably contained at a ratio of 1 to 40 parts by weight relative to 100 parts by weight of the cathode active material. Further, the binder is preferably contained at a ratio of 0.1 to 20 parts by weight relative to 100 parts by weight of the cathode active material.

The thickness of the electrode is preferably about 0.01 to 20 mm. When the thickness is too large, the electric conductivity decreases, so that it is not preferable. When the thickness is too small, the capacity per unit area decreases, so that it is not preferable. Here, the electrode obtained by application and drying may be compressed with use of a roller press or the like in order to enhance the packing density of the active material.

(III) Non-aqueous Secondary Battery

A non-aqueous secondary battery has the above-described cathode electrode, a anode electrode, an electrolyte and a separator. Hereafter, each constituent material will be described.

(a) Anode Electrode

The anode electrode can be fabricated by a known method. Specifically, the anode electrode can be fabricated by a method similar to the one described in the method of fabricating the cathode electrode. In other words, after a known binding agent and a known electroconductive material described in the method of fabricating the cathode electrode are mixed with a anode active material, this mixture powder may be molded into a sheet form, and the molded body may be press-bonded onto an electroconductive net (current collector) made of stainless steel, copper or the like. Also, the anode electrode can be fabricated by applying a slurry obtained by mixing the mixture powder with a known organic solvent described in the method of fabricating the cathode electrode or water onto a metal substrate of copper or the like.

As the anode active material, a known material can be used. In order to construct a high-energy-density battery, those in which an electric potential at which lithium is intercalated/deintercalated is close to a deposition/dissolution electric potential of metal lithium are preferable. A typical example thereof is a carbon material such as natural or artificial graphite having a particulate form (scale form, bulk form, fiber form, whisker form, spherical form, ground particulate form, or the like).

Examples of the artificial graphite include a graphite obtained by graphitization of mesocarbon microbeads, mesophase pitch powder, isotropic pitch powder or the like. Also, graphite particles in which amorphous carbon is allowed to adhere to a surface thereof can be used. Among these, natural graphite is more preferable because it is inexpensive and has an electric potential close to an oxidation reduction electric potential of lithium, so that a high-energy-density battery can be constructed.

Also, a known anode active material such as lithium transition metal oxide, lithium transition metal nitride, a transition metal oxide or silicon oxide can be used. Among these, $Li_4Ti_5O_{12}$ is more preferable because flatness of the electric potential is high and also the volume change by charging/discharging is small.

(b) Electrolyte

As the electrolyte, for example, an organic electrolytic solution, a gel-form electrolyte, a polymer solid electrolyte, an inorganic solid electrolyte, a molten salt and the like can be used. After injecting the electrolyte, an opening part of the battery is sealed. Before sealing, energization may be carried out and a produced gas may be removed.

Examples of the organic solvent constituting the organic electrolytic solution include cyclic carbonates such as propylene carbonate (PC), ethylene carbonate (EC) and butylene carbonate; chain carbonates such as dimethyl carbonate (DMC), diethyl carbonate (DEC), ethyl methyl carbonate and dipropyl carbonate; lactones such as γ-butyrolactone (GBL) and γ-valerolactone; furans such as tetrahydrofuran and 2-methyltetrahydrofuran; ethers such as diethyl ether, 1,2-dimethoxyethane, 1,2-diethoxyethane, ethoxymethoxyethane and dioxane; dimethyl sulfoxide; sulfolane; methylsulfolane; acetonitrile; methyl formate; methyl acetate and the like. These may be used as a mixture of one or more kinds.

Also, cyclic carbonates such as PC, EC and butylene carbonate are suitable as a solvent to be mixed with GBL because of having a high boiling point.

Examples of an electrolyte salt constituting the organic electrolytic solution include lithium salts such as lithium borofluoride ($LiBF_4$), lithium hexafluorophosphate ($LiPF_6$), lithium trifluoromethanesulfonate ($LiCF_3SO_3$), lithium trifluoroacetate ($LiCF_3COO$) and lithium bis(trifluoromethanesulfone)imide ($LiN(CF_3SO_2)_2$). These can be used as a mixture of one or more kinds. The salt concentration of the electrolytic solution is suitably 0.5 to 3 mol/L.

(c) Separator

The above-described separator may be, for example, a porous material, a non-woven cloth or the like. As a material of the separator, those that are not dissolved or swollen by the above-described organic solvent contained in the electrolyte are preferable. Specific examples thereof include polyester polymers, polyolefin polymers (for example, polyethylene, polypropylene), ether polymers, and inorganic materials such as glass.

(d) Other Constituent Elements

The non-aqueous secondary battery may have other constituent elements such as a battery case. As the other constituent elements, various constituent elements used in a conventionally known non-aqueous electrolyte secondary battery can be used without any particular limitation.

(e) Method of Producing Non-aqueous Secondary Battery

The non-aqueous secondary battery can be fabricated, for example, by carrying out a step of laminating the cathode electrode and the anode electrode with a separator interposed therebetween and a step of injecting the electrolyte into the separator. The cathode electrode and the anode electrode laminated with the separator interposed therebetween is referred to as a laminate body. The laminate body may have, for example, a strip-like planar shape. Also, in a case of fabricating a tubular or flat battery, the laminate body may be rounded and wound.

One or a plurality of the laminate bodies are inserted into the inside of a battery container. Typically, the cathode electrode and the anode electrode are connected to an external electroconductive terminal of the battery. Thereafter, the battery container is sealed so as to shield the electrodes and the separator against ambient air.

A method of sealing in the case of a tubular battery is typically a method of fitting a lid having a packing made of resin into an opening of the battery container and caulking the container. Also, in the case of a prismatic battery, a method of attaching a metallic lid called a sealed opening plate to an opening part and performing welding can be used. Besides these methods, a method of sealing with use of a binding agent and a method of fixing with a screw through the intermediary of a gasket can be used. Further, a method of sealing with a laminate film in which a thermoplastic resin is bonded to a metal foil can be used. Here, an opening part for injecting the electrolyte may be provided at the time of sealing.

The present invention is not limited to the above-described contents and various changes can be made within the scope defined by the claims. In other words, secondary batteries obtained by combining technical means suitably modified within the scope defined by the claims are also included within the technical scope of the present invention.

EXAMPLES

Hereafter, the present invention will be described in more detail on the basis of examples; however, the present invention is not limited to the following examples. Here, for the chemical reagents used in the examples, analytical grade reagents manufactured by Kishida Chemical Co., Ltd. were used unless specified otherwise.

Example 1

As starting source materials, $LiCH_3COO$ as a lithium source, $Fe(NO_3)_3 \cdot 9H_2O$ as an iron source, $Ti(OC_4H_9)_4$ as a titanium source, $H_3PO_4$ as a phosphorus source and $Si(OC_2H_5)_4$ as a silicon source were used. By setting the weight of $LiCH_3COO$ serving as the lithium source to be 1.3196 g, the above materials were weighed so that the molar ratio thereof would be Li:Fe:Ti:P:Si=1:0.875:0.125:0.75:0.25. First, the Fe source was dissolved in 30 ml of ethanol, and subsequently the Li source, Si source and Ti source were dissolved in this order. Finally, the P source which had been diluted with ethanol was mixed with the ethanol in which the other elements had been dissolved. After stirring at room temperature for one hour with a stirrer, the mixture was gelled with a drier of 60° C., followed by drying to obtain a precursor.

To the obtained precursor, 15 wt % of sucrose was added, and the mixture was fired at 600° C. in a nitrogen atmosphere for 12 hours to synthesize a single phase powder of $LiFe_{0.875}Ti_{0.125}P_{0.75}Si_{0.25}O_4$ which is a cathode active material of olivine type. The obtained sample will be referred to as A1.

Example 2

As starting source materials, $LiCH_3COO$ as a lithium source, $Fe(NO_3)_3 \cdot 9H_2O$ as an iron source, $Ti(OC_4H_9)_4$ as a titanium source, $ZrCl_4$ as a zirconium source, $H_3PO_4$ as a phosphorus source and $Si(OC_2H_5)_4$ as a silicon source were used. By setting the weight of $LiCH_3COO$ serving as the lithium source to be 1.3196 g, the above materials were weighed so that the molar ratio thereof would be Li:Fe:Ti:Zr:P:Si=1:0.875:0.0625:0.0625:0.75:0.25. First, the Fe source was dissolved in 30 ml of ethanol, and subsequently the Li source, Si source, Ti source and Zr source were dissolved in this order. Finally, the P source which had been diluted with ethanol was mixed with the ethanol in which the other elements had been dissolved. After stirring at room temperature for one hour with a stirrer, the mixture was gelled with a drier of 60° C., followed by drying to obtain a precursor.

To the obtained precursor, 15 wt % of sucrose was added, and the mixture was fired at 600° C. in a nitrogen atmosphere for 12 hours to synthesize a single phase powder of $LiFe_{0.875}Ti_{0.0625}Zr_{0.0625}P_{0.75}Si_{0.25}O_4$ which is a cathode active material of olivine type. The obtained sample will be referred to as A2.

Example 3

As starting source materials, $LiCH_3COO$ as a lithium source, $Fe(NO_3)_3 \cdot 9H_2O$ as an iron source, $NbCl_5$ as a niobium source, $H_3PO_4$ as a phosphorus source and $Si(OC_2H_5)_4$ as a silicon source were used. By setting the weight of $LiCH_3COO$ serving as the lithium source to be 1.3196 g, the above materials were weighed so that the molar ratio thereof would be Li:Fe:Nb:P:Si=1:0.95:0.05:0.85:0.15. First, the Fe source was dissolved in 30 ml of ethanol, and subsequently the Li source, Si source and Nb source were dissolved in this order. Finally, the P source which had been diluted with ethanol was mixed with the ethanol in which the other elements had been dissolved. After stirring at room temperature for one hour with a stirrer, the mixture was gelled with a drier of 60° C., followed by drying to obtain a precursor.

To the obtained precursor, 15 wt % of sucrose was added, and the mixture was fired at 600° C. in a nitrogen atmosphere for 12 hours to synthesize a single phase powder of $LiFe_{0.95}Nb_{0.05}P_{0.85}Si_{0.15}O_4$ which is a cathode active material of olivine type. The obtained sample will be referred to as A3.

Example 4

As starting source materials, $LiCH_3COO$ as a lithium source, $Fe(NO_3)_3 \cdot 9H_2O$ as an iron source, $NbCl_5$ as a niobium source, $H_3PO_4$ as a phosphorus source and $Si(OC_2H_5)_4$ as a silicon source were used. By setting the weight of $LiCH_3COO$ serving as the lithium source to be 1.3196 g, the above materials were weighed so that a molar ratio thereof would be Li:Fe:Nb:P:Si=1:0.975:0.025:0.925:0.075. First, the Fe source was dissolved in 30 ml of ethanol, and subsequently the Li source, Si source and Nb source were dissolved in this order. Finally, the P source which had been diluted with ethanol was mixed with the ethanol in which the other elements had been dissolved. After stirring at room temperature for one hour with a stirrer, the mixture was gelled with a drier of 60° C., followed by drying to obtain a precursor.

To the obtained precursor, 15 wt % of sucrose was added, and the mixture was fired at 600° C. in a nitrogen atmosphere for 12 hours to synthesize a single phase powder of $LiFe_{0.975}Nb_{0.025}P_{0.925}Si_{0.075}O_4$ which is a cathode active material of olivine type. The obtained sample will be referred to as A4.

Comparative Example 1

As starting source materials, $LiCH_3COO$ as a lithium source, $Fe(NO_3)_3 \cdot 9H_2O$ as an iron source, $ZrCl_4$ as a zirconium source, $H_3PO_4$ as a phosphorus source and $Si(OC_2H_5)_4$ as a silicon source were used. By setting the weight of $LiCH_3COO$ serving as the lithium source to be 1.3196 g, the above materials were weighed so that the molar ratio thereof would be Li:Fe:Zr:P:Si=1:0.9:0.1:0.8:0.2. First, the Fe source was dissolved in 30 ml of ethanol, and subsequently the Li source, Si source and Zr source were dissolved in this order. Finally, the P source which had been diluted with ethanol was mixed with the ethanol in which the other elements had been dissolved. After stirring at room temperature for one hour with a stirrer, the mixture was gelled with a drier of 60° C., followed by drying to obtain a precursor.

To the obtained precursor, 15 wt % of sucrose was added, and the mixture was fired at 600° C. in a nitrogen atmosphere for 12 hours to synthesize a single phase powder of LiFe$_{0.9}$Zr$_{0.1}$P$_{0.8}$Si$_{0.2}$O$_4$ (M2 is not contained) which is a cathode active material of olivine type. The obtained sample will be referred to as B1.

Comparative Example 2

As starting source materials, LiCH$_3$COO as a lithium source, Fe(NO$_3$)$_3$·9H$_2$O as an iron source and H$_3$PO$_4$ as a phosphorus source were used. By setting the weight of LiCH$_3$COO serving as the lithium source to be 1.3196 g, the above materials were weighed so that the molar ratio thereof would be Li:Fe:P=1:1:1. First, the Fe source was dissolved in 30 ml of ethanol, and subsequently the Li source was dissolved. Finally, the P source which had been diluted with ethanol was mixed with the ethanol in which the other element had been dissolved. After stirring at room temperature for one hour with a stirrer, the mixture was gelled with a drier of 60° C., followed by drying to obtain a precursor.

To the obtained precursor, 15 wt % of sucrose was added, and the mixture was fired at 600° C. in a nitrogen atmosphere for 12 hours to synthesize a single phase powder of LiFePO$_4$ (M2, M3 and Si are not contained) which is a cathode active material of olivine type. The obtained sample will be referred to as B2.

(Structural Analysis of Samples and Evaluation of Battery Characteristics)

With respect to the samples of A 1 to A4 and B1 to B2 obtained in the above-described examples and comparative examples, the following measurement was carried out.

<Structural Analysis of Cathode Active Material>

The above-described synthesized cathode active material was crushed with use of a mortar to form a fine powder, and X-ray measurement was carried out by an X-ray analysis apparatus (product name: MiniFlexII, manufactured by Rigaku Co., Ltd.) from 10° to 80° using a Cu tube ball at room temperature, thereby to obtain a powder X-ray diffraction pattern. The obtained powder X-ray diffraction pattern was subjected to Rietveld analysis to obtain lattice constants. Also, the lattice constants (a-axis, b-axis, c-axis and lattice volume V) of each sample obtained by structural analysis of the powder are shown in Table 1.

(relative to the cathode active material) of acetylene black (product name: "DenkaBlack", manufactured by Denki Kagaku Kogyo Kabushiki Kaisha) as an electroconductive material and about 10 wt % (relative to the cathode active material) of a polyvinylidene fluoride resin powder as a binding agent were mixed.

This mixture was dissolved in a solvent such as N-methyl-2-pyrrolidone to form a slurry, and this was applied onto both surfaces of an aluminum foil having a thickness of 20 μm by the doctor blade method to obtain a coating film. The application amount was set to be about 5 mg/cm$^2$. After this coating film was dried, the resultant was pressed to fabricate a cathode electrode. Here, the size of the cathode electrode was set to be 2 cm×2 cm.

<Method of Fabricating Beaker Cell>

With use of the cathode electrode obtained by the above fabrication method, a beaker cell was fabricated by the following procedure. With use of the fabricated beaker cell, initial characteristics and volume change ratio of each sample were measured.

The above-described cathode electrode and Li metal as a counter electrode were immersed in 50 ml of an electrolytic solution in a 100 ml glass container. As the electrolytic solution (manufactured by Kishida Chemical Co., Ltd.), one in which LiPF$_6$ had been dissolved so as to attain a concentration of 1.4 mol/L in a solvent obtained by mixing ethylene carbonate and diethyl carbonate so that a volume ratio would be 5:5 was used.

<Measurement of Initial Charging/Discharging Capacity>

The beaker cell fabricated in this manner was subjected to initial charging in an environment of 25° C. The charging current was set to be 0.1 C, and the charging was ended at a time point at which the electric potential of the battery reached 4 V. After the charging was ended, discharging was carried out at 0.1 C, and the discharging was ended at a time point at which the electric potential of the battery reached 2.0 V, so as to determine an actual measured capacity of this battery. Also, charging/discharging was carried out at 25° C. at 2 C, and the ratio of the charging/discharging capacity relative to the case of 0.1 C was determined. Results of these are shown in Table 2.

<Measurement of Volume Change Ratio>

With use of the cathode electrode of the beaker cell after the above initial characteristics measurement, lattice constants in the active material after deintercalation of Li were determined. As the cathode active material after deintercalation of Li, a cathode active material having the same composition as that in a state of deintercalation of Li on which the charging capacity had been confirmed was used, and the X-ray measurement was carried out at room temperature. Specifically, in the above beaker cell, the cathode electrode was taken out in a fully charged state, and an XRD measurement of the electrode after the above deintercalation of Li was carried out to perform structural analysis of the cathode active material.

TABLE 1

| sample name | source composition | a | b | c | V |
| --- | --- | --- | --- | --- | --- |
| A1 | LiFe0.875Ti0.125P0.75Si0.2504 | 10.323 | 5.998 | 4.695 | 290.712 |
| A2 | LiFe0.875Ti0.0625Zr0.0625P0.75Si0.2504 | 10.326 | 6.002 | 4.702 | 291.433 |
| A3 | LiFe0.95Nb0.05P0.85Si0.1504 | 10.334 | 6.006 | 4.699 | 291.612 |
| A4 | LiFe0975Nb0.025P0.925Si0.07504 | 10.331 | 6.005 | 4.699 | 291.535 |
| B1 | LiFe0.9Zr0.1P0.8Si0.204 | 10.335 | 6.004 | 4.707 | 292.108 |
| B2 | LiFeP04 | 10.330 | 6.010 | 4.690 | 291.171 |

<Fabrication of Cathode Electrode>

Next, a cathode electrode for characteristics evaluation was fabricated by the following procedure.

About 1 g of the cathode active material was weighed and crushed with use of an agate mortar. To this, about 10 wt %

The volume change ratio (%) by charging/discharging was calculated by determining each volume from the lattice constants of the structure at the charging time and the lattice constants of the structure at the discharging time and using the following formula.

Volume change ratio (%)=(1−volume of the structure at the charging time/volume of the structure at the discharging time)×100

Here, the structure at the time of charging is assumed to be a structure at the time of deintercalation of Li, and the structure at the time of discharging is assumed to be a structure at the time of intercalation of Li. Also, the volume change ratio obtained here is shown in Table 2.

<Measurement of Capacity Retaining Ratio>

The above-described cathode electrode and a anode electrode fabricated by the following procedure were combined to fabricate a laminate cell, and a capacity retaining ratio was measured.

As a anode active material, natural graphite powder was used. To this anode active material, about 10 wt % of a polyvinylidene fluoride resin powder was mixed as a binding agent. This mixture was dissolved in N-methyl-2-pyrrolidone to form a slurry. The obtained slurry was applied onto both surfaces of a copper foil having a thickness of 20 µm to obtain a coating film. After drying the coating film, the resultant was pressed to fabricate the anode electrode.

The cathode electrode fabricated in each of the examples and comparative examples was cut out to a size of 25 mm×25 mm. On the other hand, the above-described anode electrode was cut out to a size of 30 mm×30 mm. As electric current introduction terminals of the battery, a tab made of aluminum and having a width of 5 mm×length of 50 mm was welded to the cathode electrode, and a tab made of Ni and having a width of 5 mm×length of 50 mm was welded to the anode electrode.

A laminate body was obtained by interposing a separator made of porous polyethylene between the obtained cathode electrode and anode electrode provided with the tabs. The laminate body was interposed between laminate films obtained by bonding a thermoplastic resin onto two sheets of metal foils, and the peripheries of the laminate films were tightly closed by thermal fusion, thereby to obtain an outer cladding of the battery. Here, in this outer cladding, an opening for electrolyte injection was provided.

Through the opening, the laminate body was impregnated with an electrolyte obtained by dissolving $LiPF_6$ at a concentration of 1 mol/L in a solvent made of 50 vol % of ethylene carbonate and 50 vol % of diethyl carbonate.

After the impregnation, the opening of the outer cladding was sealed to obtain the non-aqueous secondary battery.

FIG. 1 shows a cross-sectional view of the obtained non-aqueous secondary battery. Here, in FIG. 1, the non-aqueous secondary battery has the cathode electrode 1, the anode electrode 2, the separator 3, the tab 4, and the laminate film 5.

The battery fabricated in this manner was subjected to initial charging in an environment of 25° C. The charging current was set to be 0.1 C, and the charging was ended at a time point at which the electric potential of the battery reached 4 V. After the charging was ended, discharging was carried out at 0.1 C, and the discharging was ended at a time point at which the electric potential of the battery reached 2.0 V, so as to determine an initial capacity of this battery. Further, charging/discharging was repeated at an electric current of 1 C, and the discharging capacity at the 1000th time was measured to determine the capacity retaining ratio by the following formula.

Capacity retaining ratio=(discharging capacity at the 1000th time)/(initial discharging capacity)×100

The obtained results are shown in Table 2.

TABLE 2

| sample name | initial discharging capacity (mAh/g) | 2 C/0.1 C | volume change ratio (%) | capacity retaining ratio at 1000th time |
|---|---|---|---|---|
| A1 | 133.8 | 93% | 5.4% | 81% |
| A2 | 130.2 | 90% | 4.6% | 85% |
| A3 | 138.6 | 92% | 5.0% | 83% |
| A4 | 142.1 | 91% | 5.4% | 81% |
| B1 | 77.9 | 84% | 2.9% | 94% |
| B2 | 150.3 | 91% | 6.5% | 76% |

From Table 2, it will be understood that the cathode active material of the present invention not only is excellent in view of safety and cost performance but also has a high initial discharging capacity, so that a non-aqueous secondary battery having a long lifetime can be provided.

The cathode active material according to the present invention is characterized by having a composition represented by the general formula (1). With this construction, the volume change generated at the time of intercalation/deintercalation of Li can be restrained, and also the diffusibility of Li ions and electron conductivity can be improved. As a result thereof, when a battery is fabricated by using the cathode active material, the expansion and contraction of the cathode electrode due to charging/discharging can be restrained, and also excellent charge/discharge characteristics can be obtained. Therefore, a cathode active material capable of providing a battery excellent not only in view of safety and cost performance but also in long lifetime and charge/discharge characteristics can be provided.

When M1 has a single element composition of Fe or Mn or has a mixed element composition of Fe and Mn, a cathode active material capable of providing a battery more excellent in view of safety, cost performance, long lifetime and charge/discharge characteristics can be provided.

When "x", "y" and "z" satisfy the formula $x+y+z \geq 1$, a cathode active material capable of providing a battery more excellent in view of safety, cost performance, long lifetime and charge/discharge characteristics can be provided.

When "m" and "n" satisfy the formula $0 < m+n \leq 1.5$, a cathode active material capable of providing a battery more excellent in view of safety, cost performance, long lifetime and charge/discharge characteristics can be provided.

When M2 is Ti or Nb, a cathode active material capable of providing a battery more excellent in view of safety, cost performance, long lifetime and charge/discharge characteristics can be provided.

When Zr is contained as M3, a cathode active material capable of providing a battery more excellent in view of safety, cost performance, long lifetime and charge/discharge characteristics can be provided.

When M2 is Ti and M3 is Zr, a cathode active material capable of providing a battery more excellent in view of safety, cost performance, long lifetime and charge/discharge characteristics can be provided.

When "a", "x", "y", "z", "m" and "n" satisfy the formula $a+x+y+z+m+n=3$, a cathode active material capable of providing a battery more excellent in view of safety, cost performance, long lifetime and charge/discharge characteristics can be provided.

Also, the cathode electrode according to the present invention is characterized by containing the above-described cathode active material, the electroconductive material and the binding agent. For this reason, a cathode electrode capable of providing a battery not only being excellent in view of safety and cost performance but also having a long lifetime can be advantageously provided.

Further, the non-aqueous secondary battery according to the present invention is characterized by having the above-described cathode electrode, the anode electrode, the electrolyte and the separator. For this reason, a battery excellent not only in view of safety and cost performance but also in long lifetime and charge/discharge characteristics can be advantageously provided.

What is claimed is:

1. A cathode active material comprising a composition represented by the following general formula (1):

$$Li_a M1_x M2_y M3_z P_m Si_n O_4 \quad (1)$$

wherein M1 is at least one kind of element selected from the group of Mn, and Fe; M2 is any one kind of element selected from the group of Ti and Nb; M3 is at least one kind of element selected from the group of Zr, Sn, Y and Al; "a" satisfies $0<a\leq 1$; "x" satisfies $0<x\leq 2$; "y" satisfies $0<y<1$; "z" satisfies $0\leq z<1$; "m" satisfies $0\leq m<1$; and "n" satisfies $0<n\leq 1$.

2. The cathode active material according to claim 1, wherein M1 has a single element composition of Fe or Mn or has a mixed element composition of Fe and Mn.

3. The cathode active material according to claim 1, wherein "x", "y" and "z" satisfy the formula $x+y+z\geq 1$.

4. The cathode active material according to claim 1, wherein "m" and "n" satisfy the formula $0<m+n\leq 1.5$.

5. The cathode active material according to claim 1, wherein M2 is Ti or Nb.

6. The cathode active material according to claim 1, wherein Zr is contained as M3.

7. The cathode active material according to claim 1, wherein M2 is Ti and M3 is Zr.

8. The cathode active material according to claim 1, wherein "a", "x", "y", "z", "m" and "n" satisfy the formula $a+x+y+z+m+n=3$.

9. A cathode electrode comprising the cathode active material of claim 1, an electroconductive material, and a binder.

10. A non-aqueous secondary battery comprising the cathode electrode of claim 9, an anode electrode, an electrolyte and a separator.

* * * * *